Nov. 5, 1935.  C. H. POYTHRESS  2,020,208
CONNECTION BETWEEN A HOE SHANK AND BLADE AND METHOD OF MAKING THE SAME
Original Filed March 8, 1934
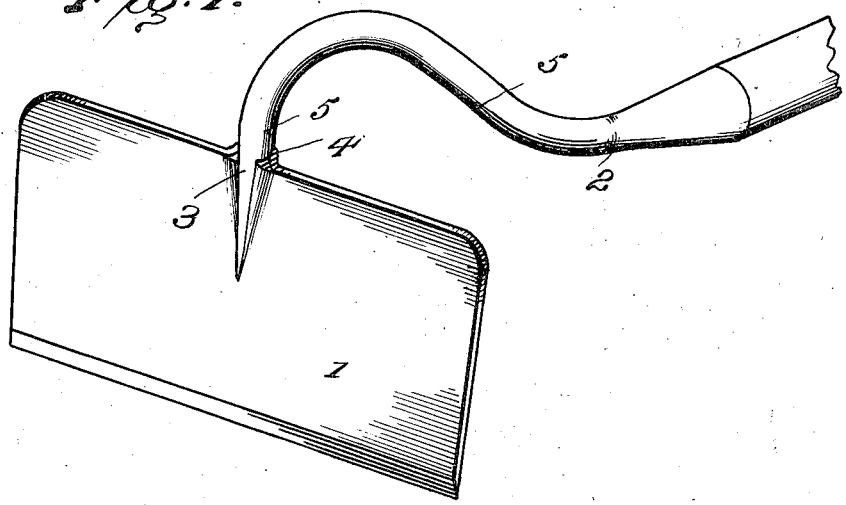
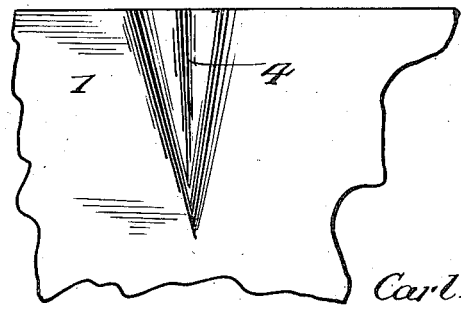
Inventor
Carl H. Poythress Patented Nov. 5, 1935

2,020,208

UNITED STATES PATENT OFFICE 2,020,208

CONNECTION BETWEEN A HOE SHANK AND BLADE AND METHOD OF MAKING THE SAME

Carl H. Poythress, Laurel, Miss.

Original application March 8, 1934, Serial No. 714,681, now Patent No. 2,003,463, dated June 4, 1935. Divided and this application July 19, 1934, Serial No. 736,076

3 Claims. (Cl. 76—109)

This invention relates to a method and means for providing and connecting the blade and shank of a hoe or like implement with a view to reinforcing the rigidity of the upper portion of the blade and avoiding any projection which might tend to accumulate the soil in which the blade is used.

The primary object of the present invention is to form the upper edge of the blade with an offset defining a conical channel and form the cooperating end of the shank with a conical portion corresponding in shape and dimension to the channel, with the channel approximating one-half the dimension of the pointed end of the shank to thereby leave substantially one-half the pointed end of the shank projecting beyond the surface of the blade when the shank is in the channel. The shank is thus exposed throughout its full length and is designed to be welded in place, with the welding material overlying and enveloping the exposed part of the shank to provide in effect a channel opposite that formed in the blade to completely envelop the pointed end of the shank and secure the shank in place rigidly throughout its full length, with the welding material presenting a smooth continuity of the blade proper merging into the blade at the sides and extreme end and thus avoiding obstructions at the connection.

The invention is illustrated in the accompanying drawing, in which:

Figure 1 is a perspective view showing the improved hoe and illustrating particularly the connection of the shank and blade as completed.

Figure 2 is a broken face view of the blade.

Figure 3 is a cross section of the union between the blade and shank.

The improved hoe is shown as including a blade 1 and a shank 2. The blade-connected end of the shank is tapered off to present an elongated conical point 3. The blade 1, which is otherwise of conventional or any desired outline or shape, is formed in its upper edge, preferably though not necessarily centrally thereof, with a channel 4.

The channel 4 is formed by offsetting the material of the blade to one side, preferably that side of the blade next the handle. The shape of this channel corresponds approximately to the contour of one-half of the pointed end 3 of the shank, considered longitudinally, that is to say, the channel 4 is substantially conical in longitudinal section and approaches a semi-circle in transverse section, the sides of the channel gradually merging into the plane of the blade proper.

The shank, or more particularly the pointed end 3 thereof, following any desired curving of the shank, as illustrated, for example, at 5, is placed in the channel 4 and the connection welded on that side of the blade opposite the formed channel. The welding material is either initially applied or subsequently machined, so as to complete on the welded side of the blade a substantial duplicate of the walls of the channel 4, as for example as illustrated at 6 in Figure 3. Thus, when completely welded, the appearance will be that of a socket into which the pointed end 3 of the socket is fitted. Of course, the welding material completely fills all portions of the channel 4 not occupied by the shank and further anchors the shank to the walls of the channel, as well understood in connection with welding.

This connection of the shank and blade materially relieves the tension or strain on the steel where the shank is welded or brazed and tends to prevent cracking or breaking of the blade or disconnection of the blade and shank. The connection presents a completely exposed area which will actually permit a better and stronger welding or brazing action. It materially reinforces the rigidity of the upper portion of the blade and entirely avoids any projection which might tend to accumulate any soil in which the blade is used, with a consequent deteriorating effect after long use.

Of course, the shape of the shank immediately beyond the blade is unimportant and any desired shape is contemplated.

This application is a division of my application filed March 8, 1934, Serial No. 714,681, now Patent No. 2,003,463, granted June 4, 1935.

What is claimed to be new is:

1. A method of uniting a hoe shank and blade, consisting in forming the end of the shank with an elongated tapered end, forming the blade with a channel corresponding in shape to approximately one-half that of the tapered point of the shank considered longitudinally, and placing the tapered end of the shank in the channel of the blade and welding sufficient additional metal to the connection on the exposed side of the blade to secure the shank in the channel and to present a smooth, unbroken surface on the exposed side of the blade corresponding approximately in shape to that of the recessed wall on the opposite side of the blade.

2. A connection between a hoe shank and blade, comprising a hoe shank having the terminal formed as an elongated tapered point, a blade having its upper portion formed with an offset channel corresponding in size and shape to the similar characteristics of the tapered point of the shank throughout one longitudinal half thereof, and means for securing the tapered end of the shank in said recess by the addition of metal on the open side of the recess to overlie the tapered shank and complete an integral metallic formation on the open side of the recess to substantially correspond to the wall of the recess on the opposite side, said metal integrally uniting the blade and shank.

3. A connection between a hoe shank and blade, comprising a hoe shank having the terminal formed as an elongated tapered point, a blade having its upper portion formed with an offset channel corresponding in size and shape to the similar characteristics of the tapered point of the shank throughout one longitudinal half thereof, and means for securing the tapered end of the shank in said recess by the addition of metal on the open side of the recess to overlie the tapered shank and complete a metallic formation on the open side of the recess to substantially correspond to the wall of the recess on the opposite side, the additional metal being added by welding.

CARL H. POYTHRESS. [L. S.]